(12) United States Patent
Wang et al.

(10) Patent No.: US 11,727,861 B2
(45) Date of Patent: Aug. 15, 2023

(54) PIXEL DRIVE CIRCUIT, DRIVE CIRCUIT OF DISPLAY PANEL, AND DISPLAY APPARATUS

(71) Applicants: BOE MLED Technology Co., Ltd., Beijing (CN); BOE Technology Group Co., Ltd., Beijing (CN)

(72) Inventors: Xiurong Wang, Beijing (CN); Wei Hao, Beijing (CN); Lingyun Shi, Beijing (CN); Qibing Gu, Beijing (CN); Guofeng Hu, Beijing (CN); Tao Yang, Beijing (CN); Mengmeng Wang, Beijing (CN); Wenhao Liu, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 64 days.

(21) Appl. No.: 17/431,182

(22) PCT Filed: Feb. 7, 2021

(86) PCT No.: PCT/CN2021/075712
§ 371 (c)(1),
(2) Date: Aug. 16, 2021

(87) PCT Pub. No.: WO2021/190182
PCT Pub. Date: Sep. 30, 2021

(65) Prior Publication Data
US 2022/0301489 A1  Sep. 22, 2022

(30) Foreign Application Priority Data
Mar. 23, 2020 (CN) .......................... 202010208335.8

(51) Int. Cl.
*G09G 3/32* (2016.01)
*G09G 3/20* (2006.01)

(52) U.S. Cl.
CPC ............. *G09G 3/32* (2013.01); *G09G 3/2074* (2013.01); *G09G 2300/0408* (2013.01);
(Continued)

(58) Field of Classification Search
CPC ............... G09G 3/2007; G09G 3/2074; G09G 3/32–3291; G09G 2300/02;
(Continued)

(56) References Cited

U.S. PATENT DOCUMENTS

2005/0104875 A1  5/2005  Kwak et al.
2005/0110723 A1  5/2005  Shin
(Continued)

FOREIGN PATENT DOCUMENTS

CN  1617206 A  5/2005
CN  1622723 A  6/2005
(Continued)

OTHER PUBLICATIONS

English translation of KR-2019081903-A (Year: 2019).*
Office Action dated Mar. 28, 2022 for Chinese Patent Application No. 202010208335.8 and English Translation.
International Search Report for PCT/CN2021/075712 dated Apr. 22, 2021.

*Primary Examiner* — Nathan Danielsen
(74) *Attorney, Agent, or Firm* — Ling Wu; Stephen Yang; Ling and Yang Intellectual Property

(57) ABSTRACT

Provided are a pixel drive circuit, a drive circuit of a display panel, and a display apparatus. The pixel drive circuit includes a switch unit and a drive unit, the switch unit is connected to the drive unit, and the drive unit is configured to be connected to a plurality of sub-pixel units; the switch unit is configured to receive a scan signal and a data signal, be switched on under action of the scan signal, and send the data signal to the drive unit; and the drive unit is configured
(Continued)

to send the data signal to the plurality of sub-pixel units connected thereto in a time division manner.

10 Claims, 5 Drawing Sheets

(52) U.S. Cl.
CPC ............ *G09G 2300/0426* (2013.01); *G09G 2300/0443* (2013.01); *G09G 2300/0452* (2013.01); *G09G 2300/0804* (2013.01); *G09G 2310/0208* (2013.01); *G09G 2310/0278* (2013.01)

(58) Field of Classification Search
CPC ........ G09G 2300/04–0408; G09G 2300/0426; G09G 2300/0443; G09G 2300/0452; G09G 2300/0842; G09G 2300/0847; G09G 2300/0857; G09G 2300/0861; G09G 2310/0208; G09G 2310/0243; G09G 2310/0251; G09G 2310/027; G09G 2310/0278; G09G 2310/0267; G09G 2310/06; G09G 2310/08; G09G 2320/0233–0242; G09G 2320/0252; G09G 2320/066; G09G 2320/0666
See application file for complete search history.

(56) References Cited

U.S. PATENT DOCUMENTS

| | | | |
|---|---|---|---|
| 2010/0157189 A1* | 6/2010 | Ma | G09G 3/3648 349/48 |
| 2010/0207852 A1 | 8/2010 | Cok | |
| 2012/0139819 A1* | 6/2012 | Tsai | G09G 3/3225 345/76 |
| 2016/0099262 A1* | 4/2016 | Lin | G09G 3/32 257/43 |
| 2019/0051243 A1 | 2/2019 | Li et al. | |
| 2019/0148409 A1* | 5/2019 | Bang | G09G 3/32 345/173 |
| 2020/0312225 A1* | 10/2020 | Hussell | G09G 3/32 |
| 2021/0256898 A1* | 8/2021 | Kim | G09G 3/2003 |

FOREIGN PATENT DOCUMENTS

| | | | | |
|---|---|---|---|---|
| CN | 101127194 A | | 2/2008 | |
| CN | 101216649 A | | 7/2008 | |
| CN | 102396015 A | | 3/2012 | |
| CN | 104752468 A | | 7/2015 | |
| CN | 106157896 A | | 11/2016 | |
| CN | 107086239 A | | 8/2017 | |
| KR | 10-2008-0094419 A | | 10/2008 | |
| KR | 2019081903 A | * | 7/2019 | ........... G06F 3/0412 |

\* cited by examiner

_US 11,727,861 B2_

PIXEL DRIVE CIRCUIT, DRIVE CIRCUIT OF DISPLAY PANEL, AND DISPLAY APPARATUS

CROSS-REFERENCE TO RELATED APPLICATIONS

The present application is a U.S. National Phase Entry of International Application No. PCT/CN2021/075712 having an international filing date of Feb. 7, 2021, which claims priority to Chinese patent application No. 202010208335.8 filed to CNIPA on Mar. 23, 2020 and entitled "Pixel Drive Circuit, Drive Circuit of Display Panel, and Display Apparatus". The above-identified applications are incorporated herein by reference in their entirety.

TECHNICAL FIELD

Embodiments of the present disclosure relate to, but are not limited to, the field of display technologies (for example, the field of computer technologies), in particular to a pixel drive circuit, a drive circuit of a display panel, and a display apparatus.

BACKGROUND

A mini LED refers to an LED with an encapsulation size of 0.1-0.2 mm, which is also referred to as a sub-millimeter light emitting diode. A mini LED display consists of an array of a large number of small-sized LEDs, and there is a relatively small spacing between LEDs. The mini LED display gradually becomes a development direction of display technologies due to advantages of high brightness, high contrast, and ultra-high resolution and color saturation.

SUMMARY

The following is a brief description of the subject matter detailed herein. This brief description is not intended to limit the scope of protection of the claims.

In a first aspect, an embodiment of the present disclosure provides a pixel drive circuit, including a switch unit and a drive unit, wherein the switch unit is connected to the drive unit, and the drive unit is configured to be connected to a plurality of sub-pixel units; the switch unit is configured to receive a scan signal and a data signal, be switched on under action of the scan signal, and send the data signal to the drive unit; and the drive unit is configured to send the data signal to the plurality of sub-pixel units connected thereto in a time division manner.

In some exemplary embodiments, the switch unit includes a transistor, a gate of the transistor is configured to receive the scan signal, a first electrode is configured to receive the data signal, and a second electrode is configured to be connected to the drive unit.

In some exemplary embodiments, the drive unit includes a control sub-unit, a multi-channel selection sub-unit, and a plurality of holding sub-units.

The control sub-unit is configured to be connected to the switch unit, receive the data signal, and output a corresponding control signal under the action of the data signal.

The multi-channel selection sub-unit is configured to be connected to the control sub-unit and the plurality of holding sub-units, and select, under action of the control signal, a corresponding channel to send the corresponding data signal to the corresponding holding sub-unit.

Channels of the multi-channel selection sub-unit are connected to the plurality of holding sub-units in a one-to-one correspondence, and the plurality of holding sub-units are connected to the plurality of sub-pixel units in a one-to-one correspondence.

In some exemplary embodiments, three sub-pixel units are provided, and the three sub-pixel units include a first sub-pixel unit, a second sub-pixel unit, and a third sub-pixel unit of different colors; and the sub-pixel units and the drive unit are arranged in two rows and two columns, the first sub-pixel unit and the second sub-pixel unit are located in a first row side by side, and the third sub-pixel unit and the drive unit in a pixel unit are located in a second row side by side.

In some exemplary embodiments, three data signals are sent in a time period of a scan signal.

In some exemplary embodiments, six sub-pixel units are provided, the six sub-pixel units include a first sub-pixel unit, a second sub-pixel unit, a third sub-pixel unit, a fourth sub-pixel unit, a fifth sub-pixel unit, and a sixth sub-pixel unit; and the sub-pixel units and the drive unit are arranged in two rows and four columns, the first sub-pixel unit, the second sub-pixel unit, and the sixth sub-pixel unit are located in a first row side by side, and the third sub-pixel unit, the drive unit, the fourth sub-pixel unit, and the fifth sub-pixel unit are located in the second row side by side.

In some exemplary embodiments, six data signals are sent in a time period of a scan signal.

In a second aspect, an embodiment of the present disclosure provides a drive circuit of a display panel, including pixel units arranged in an array, a plurality of scan lines, and a plurality of data lines, wherein each of the pixel units includes the pixel drive circuit provided in any one of the embodiments of the present disclosure; and the scan line is located between adjacent row pixel units, and the data line is located between adjacent column pixel units.

In some exemplary embodiments, when sub-pixel units and a drive unit are arranged in two rows and two columns, for two adjacent columns of pixel units located in the same row, an arrangement mode of the sub-pixel units and the drive unit in the pixel unit in an n-th column and an arrangement mode of the sub-pixel units and the drive unit in the pixel unit in an (n+1)-th column mirror each other, and a mirror axis is a straight line located between the pixel unit in the (n+1)-th column and the pixel unit in the n-th column and parallel to a row direction perpendicular to a column direction, wherein n≥1.

In some exemplary embodiments, pixel units in each row are configured to be connected to scan lines in two rows, a scan line in one row is configured to provide a scan signal to pixel units in eve columns, a scan line in the other row is configured to provide a scan signal to pixel units in odd columns, and a scan line in one row passes through the pixel units.

In some exemplary embodiments, when sub-pixel units and a drive unit are arranged in two rows and four columns, for two adjacent columns of pixel units located in the same row, an arrangement mode of the sub-pixel units and the drive unit in the pixel unit in an n-th column and an arrangement mode of the sub-pixel units and the drive unit in the pixel unit in an (n+1)-th column mirror each other, and a mirror axis is a straight line located between the pixel unit in the (n+1)-th column and the pixel unit in the n-th column and parallel to a row direction perpendicular to a column direction, wherein n≥1.

In a third aspect, an embodiment of the present disclosure provides a display apparatus, including the drive circuit of the display panel provided in the above embodiments of the present disclosure.

After reading and understanding of the drawings and the detailed description, other aspects can be understood.

BRIEF DESCRIPTION OF DRAWINGS

The drawings are used to provide a further understanding of the technical solutions of the present disclosure, constitute a portion of the specification, and are used together with the embodiments of the present disclosure to explain the technical solutions of the present disclosure rather than limiting the technical solutions of the present disclosure.

DETAILED DESCRIPTION

Figure 1:
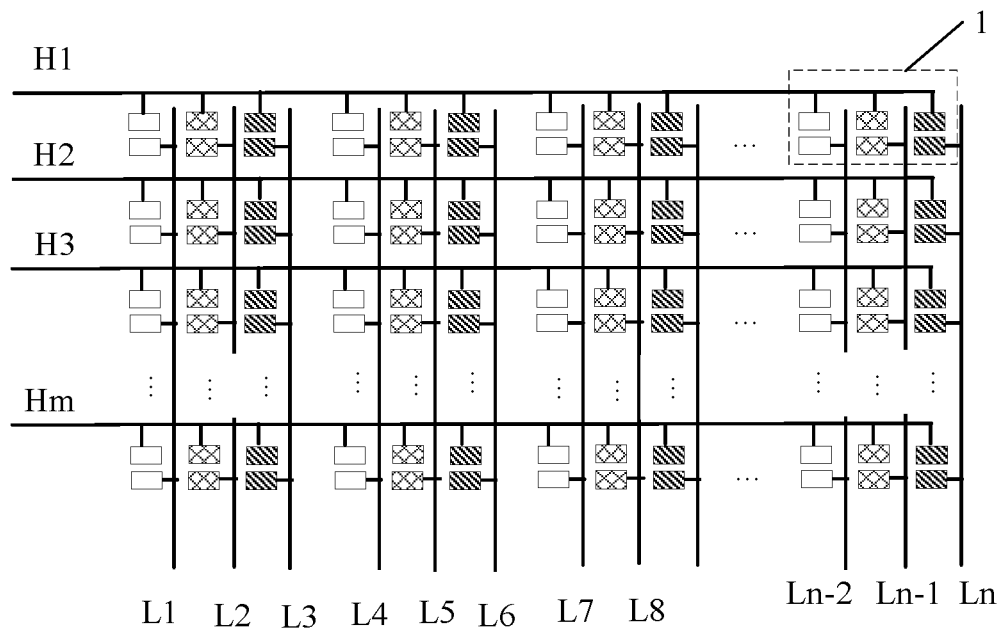
FIG. 1 illustrates a block diagram of an exemplary structure of a drive mode of a Mini LED display panel.

The present disclosure will be further described below in detail in combination with the embodiments and the drawings. The embodiments described herein are used only to explain the present disclosure and are not intended to limit the present disclosure. For convenience of description, only parts related to the disclosed embodiments are illustrated in the drawings.

Without a conflict, the embodiments in the present disclosure and the features in the embodiments may be combined with each other. Those of ordinary skill in the art should understand that modifications or equivalent replacements may be made to the technical solutions of the embodiments of the present disclosure without departing from the spirit and scope of the technical solutions of the present disclosure, which should be also included in the scope of the claims of the present disclosure. The present disclosure will be described below in combination with the embodiments with reference to the drawings.

With the development of mini LEDs, in a mini LED display product, in addition to a four-in-one encapsulated LED, LEDs with a single-color of RGB may be used for sub-pixel arrangement, and such the sub-pixel arrangement is relatively simple. Referring to FIG. 1, sub-pixel units in m rows and n columns, m row drive lines from row drive line H1 to row drive line Hm, and n column drive lines from column drive line L1 to column drive line Ln are provided, wherein the row drive line is connected to a positive electrode of each LED in the corresponding row, the column drive line is connected to a negative electrode of each LED in the corresponding column, and one pixel unit 1 includes three RGB sub-pixel units. For a display panel, the m row drive lines and the n column drive lines need to be connected to an external circuit (for example, a PCB) to provide an electrical signal for each sub-pixel unit. The above arrangement mode of the drive lines has high requirements on a lead process of the side of the panel, thereby increasing the process cost and increasing the module thickness. The present disclosure provides a hybrid drive architecture that combines the sub-pixel unit and the drive unit.

Figure 2:
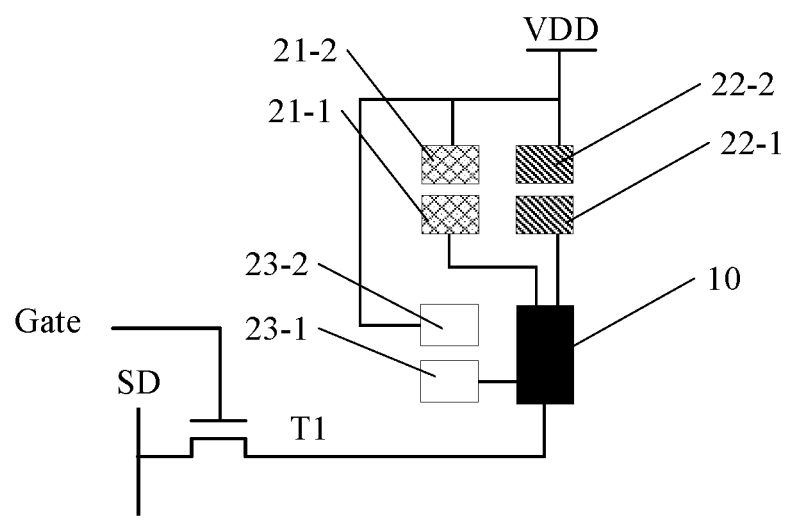
FIG. 2 illustrates a block diagram of an exemplary structure of a pixel drive circuit according to an embodiment of the present disclosure.
Figure 6:
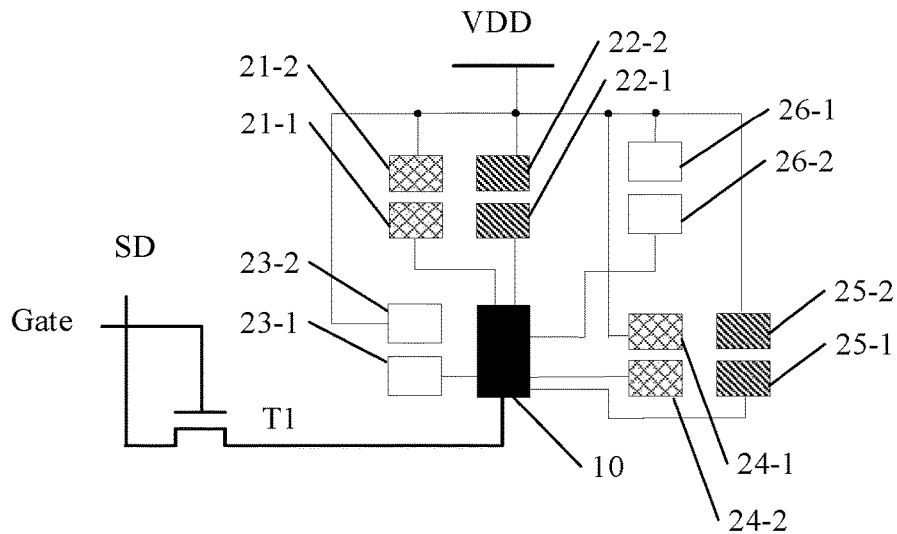
FIG. 6 illustrates a block diagram of an exemplary structure of another pixel drive circuit according to an embodiment of the present disclosure.
Figure 7:
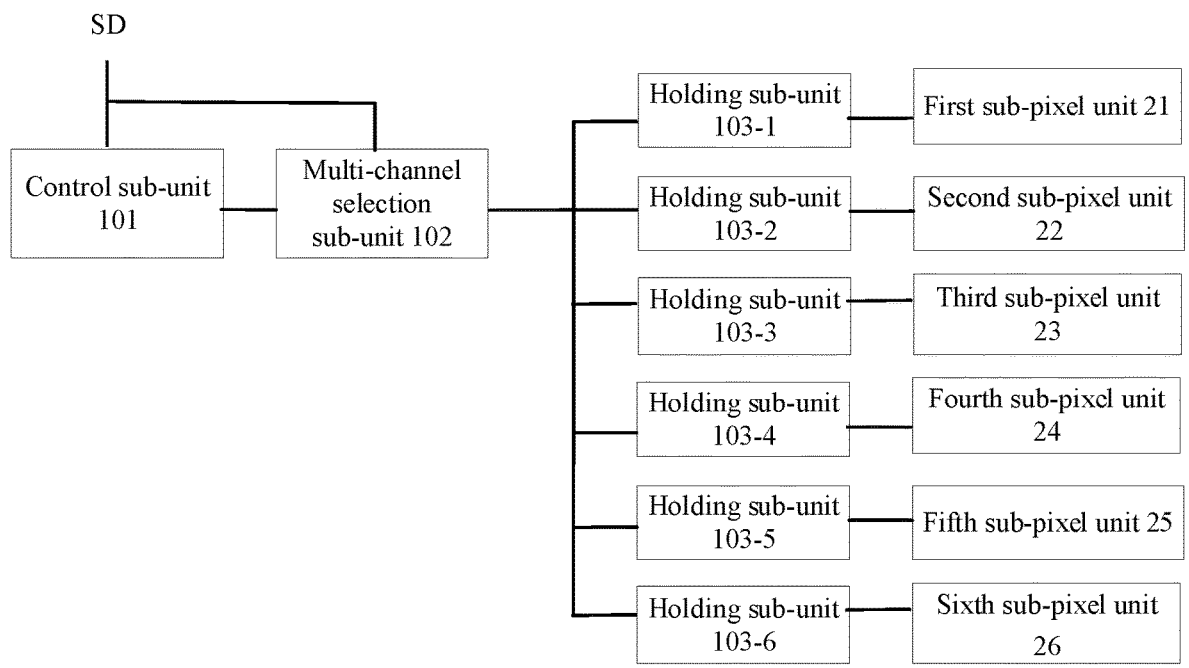
FIG. 7 illustrates a block diagram of an exemplary structure of another drive unit according to an embodiment of the present disclosure.

In an exemplary embodiment, referring to FIG. 2 and FIG. 6, a pixel drive circuit includes a switch unit and a drive unit 10, the switch unit is connected to the drive unit 10, and the drive unit 10 is configured to be connected to a plurality of sub-pixel units.

The switch unit is configured to receive a scan signal Gate and a data signal SD, be switched on under action of the scan signal Gate, and send the data signal SD to the drive unit 10. The drive unit 10 is configured to send the data signal to the plurality of sub-pixel units connected thereto in a time division manner.

The switch unit and the drive unit are configured to provide corresponding data signals to the plurality of sub-pixel units, that is, the plurality of sub-pixel units share one pixel drive circuit, so that an effect of reducing the number of signal lines (including scan lines and data lines) is achieved. The number of the plurality of sub-pixel units described herein may be any number, and the number of the sub-pixel units connected to the drive unit 10 is not limited in the embodiments of the present disclosure. In the field of the mini LED display, the sub-pixel unit may be an electroluminescent device.

Referring to FIG. 2 or FIG. 6, the switch unit may include a transistor T1, a gate of the transistor T1 receives the scan signal Gate, a first electrode of the transistor T1 receives the data signal SD, and a second electrode of the transistor T1 is connected to the drive unit 10. In actual application, according to different application scenarios, the transistor T1 in the circuit may be either an N-type transistor or a P-type transistor.

Figure 3:
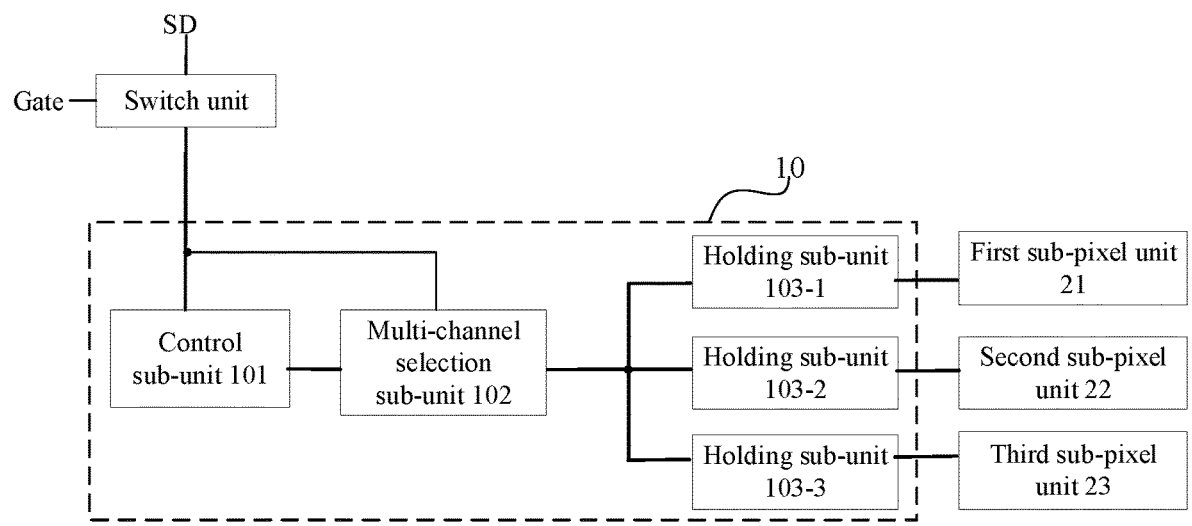
FIG. 3 illustrates a block diagram of an exemplary structure of a drive unit according to an embodiment of the present disclosure.

In an exemplary embodiment, referring to FIG. 3 which illustrates a schematic diagram of a structure of the drive unit 10, the drive unit 10 may include a control sub-unit 101, a multi-channel selection sub-unit 102, and a plurality of holding sub-units 103.

The control sub-unit 101 may be configured to be connected to the switch unit and receive the data signal SD, and the control sub-unit 101 may output a corresponding control signal under the action of the data signal SD.

The multi-channel selection sub-unit 102 may be configured to be connected to the control sub-unit 101 and the plurality of holding sub-units 103, and the multi-channel selection sub-unit 102 may select, under the action of the control signal, a corresponding channel to send the corresponding data signal to the corresponding holding sub-unit.

Channels of the multi-channel selection sub-unit 102 may be connected to the plurality of holding sub-units 103 in a one-to-one correspondence, and the plurality of holding sub-units 103 may be connected to the plurality of sub-pixel units in a one-to-one correspondence.

Referring to FIG. 2 and FIG. 3, the drive unit 10 may provide data signals to three sub-pixel units of different colors, i.e., a first sub-pixel unit 21, a second sub-pixel unit 22, and a third sub-pixel unit 23. Each sub-pixel unit includes a positive electrode and a negative electrode. In order to distinguish the positive and negative electrodes, in FIG. 2, a suffix -1 or -2 is added to the first sub-pixel unit 21, the second sub-pixel unit 22, and the third sub-pixel unit 23 to distinguish the positive and negative electrodes of each sub-pixel unit, wherein the suffix -1 represents the positive electrode and the suffix -2 represents the negative electrode. The sub-pixel units and the drive unit 10 may be arranged in two rows and two columns, wherein the first sub-pixel unit 21 and the second sub-pixel unit 22 may be located in a first row side by side, and the third sub-pixel unit 23 and the drive unit 10 may be located in a second row side by side. Such the arrangement mode of the pixel unit makes full use of the space and has a compact structure, thus suitable for high-resolution application scenarios. Referring to FIG. 2, the first sub-pixel unit 21 may be at the upper left corner of the pixel unit, the second sub-pixel unit 22 may be at the upper right corner, the third sub-pixel unit 23 may be at the lower left corner, and the drive unit 10 may be at the lower right corner. The diagonal positions of the sub-pixel units and the drive unit 10 may be interchanged, which is not limited herein. For example, the second sub-pixel unit 22 may be at the upper left corner of the pixel unit, the first sub-pixel unit 21 may be at the upper right corner, the drive unit 10 may be at the lower left corner, and the third sub-pixel unit 23 may be at the lower right corner. In addition, the first sub-pixel unit 21 may be red, the second sub-pixel unit 22 may be green, and the third sub-pixel unit 23 may be blue. A correspondence between the colors and the sub-pixel units may be matched as needed, which is not limited herein.

Figure 4:
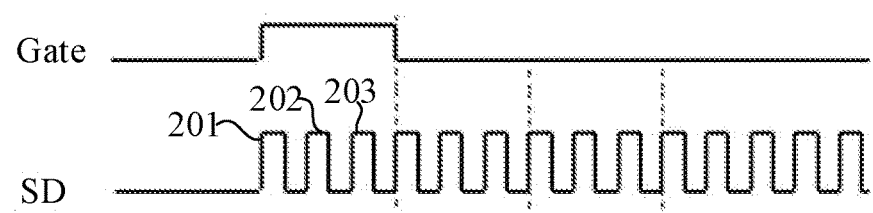
FIG. 4 illustrates a diagram of exemplary timing of scan lines and data lines in the pixel drive circuit applied in FIG. 2.

Referring to FIG. 4, there may be the following relationship between the scan signal and the data signal: three data signals may be sent sequentially in a time period of a scan signal. The time period of the scan signal refers to a time period in which the scan signal is effective. The scan signal may be effective at a low level or effective at a high level, which may be determined according to the type of the adopted transistor. The scan signal Gate in FIG. 4 is a pulse signal, which is effective at a high level; and the corresponding data signal SD is also a pulse signal, which is effective at a high level. Optionally, the data signal may be a signal effective at a low level, which is not limited herein. The drive unit 10 needs to write the three data signals to the corresponding sub-pixel units in the time period in which the scan signal is effective. In the time period in which the scan signal is effective, the switch unit is switched on, and the control sub-unit 101 receives the data signal and outputs a control signal for switch-on of the corresponding channel of the multi-channel selection sub-unit 102 according to the data signal in the time period in which each data signal is effective, so that the corresponding data signal is sent to the corresponding holding sub-unit. Referring to FIG. 4, during the time period in which the scan signal is effective, in a sub-time period of a first effective level data signal 201 of the data signal SD, the control sub-unit 101 may control a first channel of the multi-channel selection sub-unit 102 to be switched on, so that the data signal 201 is written to the holding sub-unit 103-1. Since the holding sub-unit 103-1 is connected to the sub-pixel unit 21, the sub-pixel unit 21 is lit up. During the time period in which the scan signal is effective, in a sub-time period of a second effective level data signal 202 of the data signal SD, the control sub-unit 101 may control a second channel of the multi-channel selection sub-unit 102 to be switched on, so that the data signal 202 is written to the holding sub-unit 103-2. Since the holding sub-unit 103-2 is connected to the sub-pixel unit 22, the sub-pixel unit 22 is lit up. During the time period in which the scan signal is effective, in a sub-time period of a third effective level data signal 203 of the data signal SD, the control sub-unit 101 may control a third channel of the multi-channel selection sub-unit 102 to be switched on, so that the data signal 203 is written to the holding sub-unit 103-3. Since the holding sub-unit 103-3 is connected to the sub-pixel unit 23, the sub-pixel unit 23 is lit up. In this way, the drive of the plurality of sub-pixel units is realized.

FIG. 2 just illustrates an exemplary embodiment of the drive unit. The number of the channels of the multi-channel selection sub-unit and the number of the holding sub-units may be determined as needed, and are not limited to three. For example, in the pixel unit illustrated in FIG. 6, the multi-channel selection sub-unit has six channels corresponding to six holding sub-units. In this case, there may be the following relationship between the scan signal and the data signal: the data signal may include six pulses at the effective level in the time period of a scan signal.

The pixel drive circuit in FIG. 6 is described below. The pixel unit in FIG. 6 includes six sub-pixel units, including a first sub-pixel unit 21, a second sub-pixel unit 22, a third sub-pixel unit 23, a fourth sub-pixel unit 24, a fifth sub-pixel unit 25, and a sixth sub-pixel unit 26. Each sub-pixel unit includes a positive electrode and a negative electrode. A suffix -1 or -2 is added to each of the above six sub-pixel units to distinguish the positive and negative electrodes, wherein the suffix -1 represents the positive electrode and the suffix -2 represents the negative electrode. The sub-pixel units and the drive unit 10 may be arranged in two rows and four columns, wherein the first sub-pixel unit 21, the second sub-pixel unit 22, and the sixth sub-pixel unit 26 may be located in a first row side by side, and the third sub-pixel unit 23, the drive unit 10, the fourth sub-pixel unit 24, and the fifth sub-pixel unit 25 may be located in a second row side by side.

Referring to FIG. 6, the first sub-pixel unit 21 may be in the first row and the first column of the pixel unit, the second sub-pixel unit 22 may be in the first row and the second column, the sixth sub-pixel unit 26 may be in the first row and the third column, the third sub-pixel unit 23 may be in the second row and the first column, the drive unit 10 may be in the second row and the second column, the fourth sub-pixel unit 24 may be in the second row and the third column, and the fifth sub-pixel unit 25 may be in the second row and the fourth column. The first row and the second row may be interchanged, and the position of the drive unit 10 may also be interchanged with the position of the sub-pixel unit, which is not limited herein. The first sub-pixel unit 21 and the fourth sub-pixel unit 24 may be set to red, the second sub-pixel unit 22 and the fifth sub-pixel unit 25 may be set to green, and the third sub-pixel unit 23 and the sixth sub-pixel unit 26 may be set to blue. In a display panel using red, green and blue as primary colors, this mode may drive two groups of sub-pixel units of the three primary colors. Compared with the drive circuit in FIG. 2, the drive circuit in FIG. 6 can reduce the number of the scan lines and the data lines and can facilitate improving of the display resolution.

A correspondence between the colors and the sub-pixel units may be matched as needed, which is not limited herein. The positions of the sub-pixel units are not limited to the position relationship illustrated in FIG. 6, but may be arranged in four rows and two columns as needed, as long as the uniformity of a color arrangement of the plurality of pixel units of the three primary colors is ensured and the pixel units of the same color are prevented from being arranged together.

Figure 8:
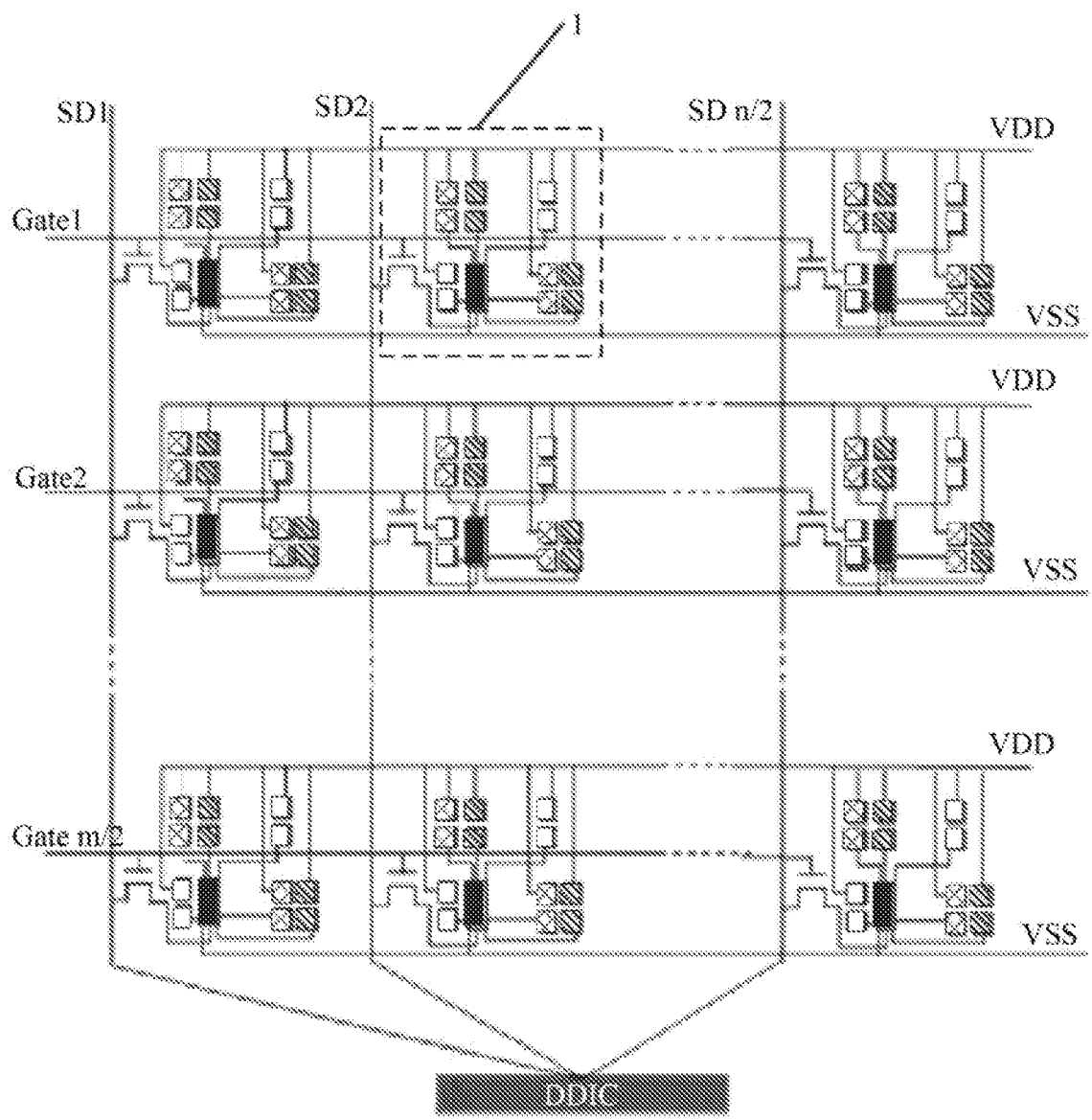
FIG. 8 illustrates a block diagram of an exemplary structure of a drive circuit of a display panel of the pixel drive circuit applied in FIG. 6.

The drive unit 10 of the drive circuit in FIG. 8 needs to write six data signals into the corresponding sub-pixel units in the time period in which the scan signal is effective. The drive unit 10 needs to sequentially write effective level pulses of the data signal into the corresponding sub-pixel units in the time period in which the scan signal is effective. Therefore, the drive unit 10 includes the control sub-unit 101, the multi-channel selection sub-unit 102, and six holding sub-units 103.

An embodiment of the present disclosure further provides a drive circuit of a display panel.

Figure 5:
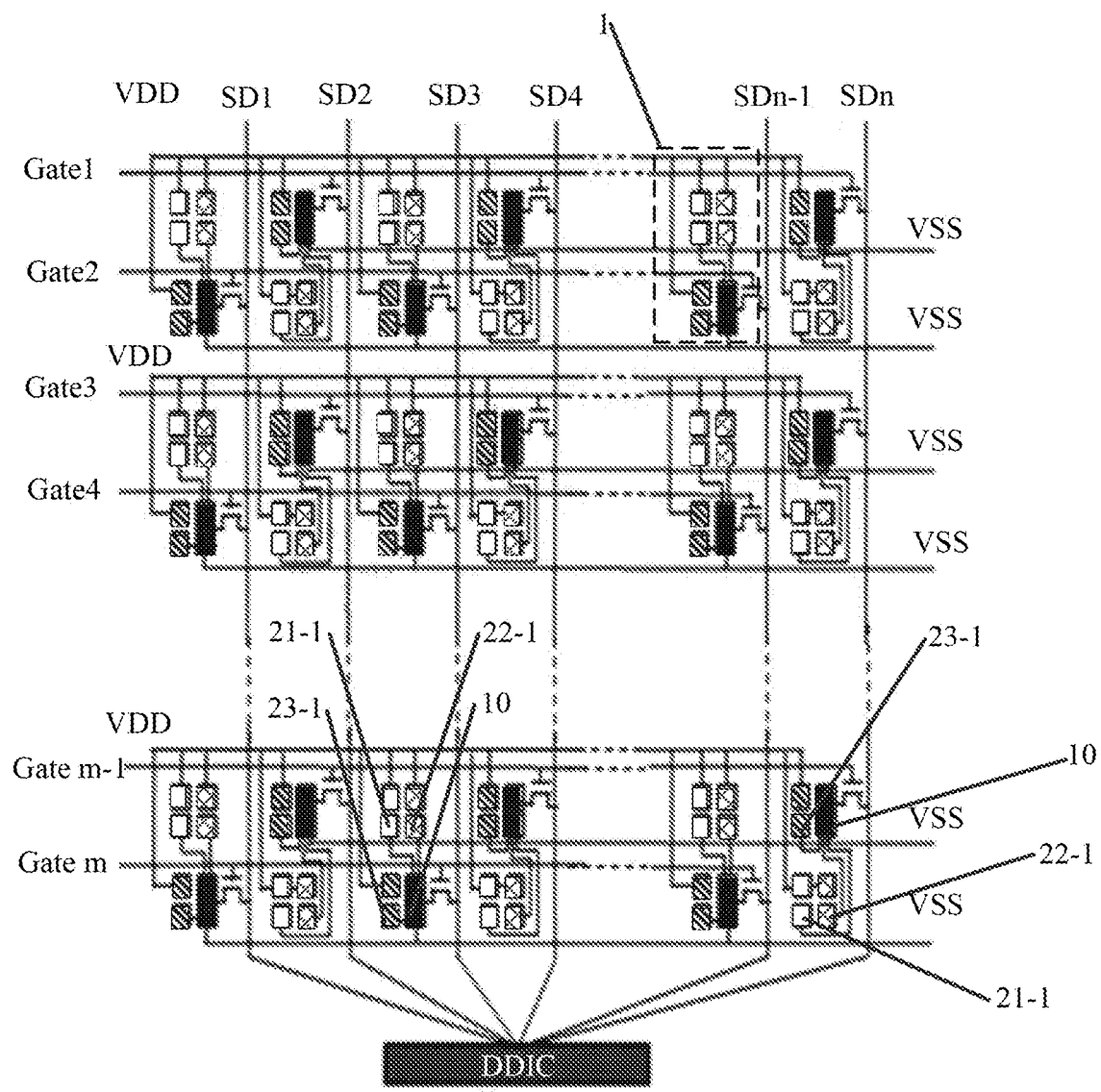
FIG. 5 illustrates a block diagram of an exemplary structure of a drive circuit of a display panel of the pixel drive circuit applied in FIG. 2.

Referring to FIG. 5 and FIG. 8, the drive circuit of the display panel includes pixel units 1 arranged in an array, a plurality of scan lines Gate, and a plurality of data lines SD. Each pixel unit 1 includes the pixel drive circuit provided in any one of the above embodiments of the present disclosure.

The scan line Gate is located between adjacent row pixel units, and the data line SD is located between adjacent column pixel units.

Referring to FIG. 5, each pixel unit may include three sub-pixel units arranged in an array, a switch unit, and a drive unit. The three sub-pixel units and the drive unit may be arranged in an array consisting of two rows and two columns, and the switch unit may be arranged on a side of the drive unit far away from the three sub-pixel units. The entire display panel includes pixel units 1 arranged in an array consisting of m/2 rows and n columns, scan lines from scan line Gate 1 to scan line Gate m in m rows, and data lines from data line SD1 to data line SDn in n columns. In order to reduce the complexity of wiring, the pixel units in each row may be connected to the scan lines in two rows, the scan line in one row may be configured to provide a scan signal to the pixel units in even columns, and the scan line in the other row may be configured to provide a scan signal to the pixel units in odd columns. The pixel units in each column may share one data line SD, and the data signal of the data line SD may be provided by a peripheral drive data chip such as Display Driver IC (DDIC) and sent to the corresponding drive unit via the switch unit. Each pixel unit includes a plurality of sub-pixel units, and arrangement modes of the sub-pixel units and the drive units in the pixel units may be different from one another. Referring to FIG. 5, for two adjacent columns of pixel units located in the same row, an arrangement mode of the sub-pixel units and the drive unit in the pixel unit in an n-th column may be obtained by mirroring an arrangement mode of the sub-pixel units and the drive unit in the pixel unit in an (n+1)-th column using a straight line that is located between the pixel unit in the (n+1)-th column and the pixel unit in the n-th column and parallel to a row direction perpendicular to a column direction as an axis, wherein n≥1, that is, the arrangement mode of the sub-pixel units and the drive unit in the pixel unit in the n-th column and the arrangement mode of the sub-pixel units and the drive unit in the pixel unit in the (n+1)-th column mirror each other, and the mirror axis is the straight line located between the pixel unit in the (n+1)-th column and the pixel unit in the n-th column and parallel to the row direction perpendicular to the column direction. Referring to FIG. 5, by vertically flipping the sub-pixel units and drive unit in the first pixel unit in the first row and the first column along an axis parallel to Gate 2, an arrangement of the sub-pixel units and drive unit in the second pixel unit in the first row and the second column may be obtained. Therefore, the first pixel unit and the second pixel unit mirror each other, and a mirror axis is the axis of the vertical flipping. Such the arrangement mode facilitates uniform distribution of all the colors. The first sub-pixel unit 21 may be configured to be at the upper left corner of the pixel unit in the first column, the second sub-pixel unit 22 may be at the upper right corner, the third sub-pixel unit 23 may be at the lower left corner, and the drive unit 10 may be at the lower right corner. The third sub-pixel unit 23 may be at the upper left corner of the pixel structure in the second column, the drive unit 10 may be at the upper right corner, the first sub-pixel unit 21 may be at the lower left corner, and the second sub-pixel unit 22 may be at the lower right corner. This embodiment may adopt a drive mode in which the pixel units in each row share one scan line.

Referring to FIG. 5, the scan lines from scan line Gate 1 to scan line Gate m in m rows may be provided by a GOA circuit or an integrated circuit (IC). Compared with the drive mode in FIG. 1, the drive mode illustrated in FIG. 5 can realize that each data line along the column direction provides a signal to more than one sub-pixel unit. Therefore, in the case of driving the same number of sub-pixel units, this embodiment can reduce the number of the signal lines.

A display panel illustrated in FIG. 8 includes pixel units 1 in m/2 rows and n/2 columns, scan lines from scan line Gate 1 to scan line Gate m/2 in m/2 rows, and data lines from data line SD1 to data line SDn/2 in n/2 columns. The pixel units in each row may share one row scan line Gate, and the pixel units in each column may share one data line SD. The data signal of the data line SD may be provided by a peripheral drive data chip DDIC and sent to the corresponding drive unit via the switch unit. The arrangement modes of the sub-pixels in the pixel units 1 in all the rows and columns may be completely identical. The scan line Gate may be located between adjacent row pixel units, and the data line SD may be located between adjacent column pixel units. Compared with the drive mode in FIG. 5, in the case of driving the same number of sub-pixel units, this embodiment can further reduce the number of leads (i.e., signal lines).

The display panel in FIG. 5 may adopt the arrangement mode similar to that of the sub-pixel units in the pixel unit 1 in each row and each column in FIG. 8, and the display panel in FIG. 8 may adopt the arrangement mode similar to that of the sub-pixel units in FIG. 5. In another words, for two adjacent columns of pixel units located in the same row, an arrangement mode of the sub-pixel units and the drive unit in the pixel unit in an n-th column may be obtained by mirroring an arrangement mode of the sub-pixel units and the drive unit in the pixel unit in an (n+1)-th column using a straight line that is located between the pixel unit in the (n+1)-th column and the pixel unit in the n-th column and parallel to a row direction perpendicular to a column direction as an axis, wherein n≥1, that is, the arrangement mode of the sub-pixel units and the drive unit in the pixel unit in the n-th column and the arrangement mode of the sub-pixel units and the drive unit in the pixel unit in the (n+1)-th column mirror each other, and the mirror axis is the straight line located between the pixel unit in the (n+1)-th column and the pixel unit in the n-th column and parallel to the row direction perpendicular to the column direction. By vertically flipping the sub-pixel units and drive unit in the first pixel unit in the first row and the first column along an axis parallel to Gate 1, an arrangement of the sub-pixel units and drive unit in the second pixel unit in the first row and the second column can be obtained. Therefore, the first pixel unit and the second pixel unit mirror each other, and a mirror axis is the axis of the vertical flipping.

An embodiment of the present disclosure further provides a display apparatus. The display apparatus includes the drive circuit of the display panel provided in any one of the above embodiments of the present disclosure.

The above described is just the exemplary embodiments of the present disclosure and the adopted technical principles. It should be understood by those skilled in the art that the scope of the invention involved in the present disclosure is not limited to the technical solutions formed by the specific combination of the above technical features, and should also cover other technical solutions formed by any combination of the above technical features or their equivalent features without departing from the concept of the invention, for example, technical solutions formed by replacing the above features with the technical features having similar functions disclosed in (but not limited to those disclosed in) the embodiments of the present disclosure.

What we claim is:

1. A pixel drive circuit, comprising a switch unit and a drive unit, wherein the switch unit is connected to the drive unit, and the drive unit is configured to be connected to a plurality of sub-pixel units;
   the switch unit is configured to receive a scan signal and a data signal, be switched on under action of the scan signal, and send the data signal to the drive unit; and
   the drive unit is configured to send the data signal to the plurality of sub-pixel units connected thereto in a time division manner;
   wherein six sub-pixel units are provided, the six sub-pixel units comprise a first sub-pixel unit, a second sub-pixel unit, a third sub-pixel unit, a fourth sub-pixel unit, a fifth sub-pixel unit, and a sixth sub-pixel unit; and
   the sub-pixel units and the drive unit are arranged in two rows and four columns, the first sub-pixel unit, the second sub-pixel unit, and the sixth sub-pixel unit are located in a first row side by side, and the third sub-pixel unit, the drive unit, the fourth sub-pixel unit, and the fifth sub-pixel unit are located in a second row side by side.

2. The pixel drive circuit according to claim 1, wherein the switch unit comprises a transistor, a gate of the transistor is configured to receive the scan signal, a first electrode of the transistor is configured to receive the data signal, and a second electrode of the transistor is configured to be connected to the drive unit.

3. The pixel drive circuit according to claim 1, wherein the drive unit comprises a control sub-unit, a multi-channel selection sub-unit, and a plurality of holding sub-units, wherein:
   the control sub-unit is configured to be connected to the switch unit, receive the data signal, and output a corresponding control signal under action of the data signal;
   the multi-channel selection sub-unit is configured to be connected to the control sub-unit and the plurality of holding sub-units, and select, under action of the control signal, a corresponding channel to send a corresponding data signal to a corresponding holding sub-unit; and
   channels of the multi-channel selection sub-unit are connected to the plurality of holding sub-units in a one-to-one correspondence, and the plurality of holding sub-units are connected to the plurality of sub-pixel units in a one-to-one connection.

4. The pixel drive circuit according to claim 1, wherein three sub-pixel units are provided, and the three sub-pixel units comprise a first sub-pixel unit, a second sub-pixel unit, and a third sub-pixel unit, which are of different colors; and
   the sub-pixel units and the drive unit are arranged in two rows and two columns, the first sub-pixel unit and the second sub-pixel unit are located in a first row side by side, and the third sub-pixel unit and the drive unit in a pixel unit are located in a second row side by side.

5. The pixel drive circuit according to claim 4, wherein three data signals are sent in a time period of a scan signal.

6. The pixel drive circuit according to claim 1, wherein six data signals are sent in a time period of a scan signal.

7. A drive circuit of a display panel, comprising pixel units arranged in an array, a plurality of scan lines, and a plurality of data lines, wherein each of the pixel units comprises the pixel drive circuit according to claim 1; and
   the scan line is located between adjacent row pixel units, and the data line is located between adjacent column pixel units; wherein
   when the sub-pixel units and the drive unit are arranged in two rows and two columns, for two adjacent columns of pixel units located in a same row, an arrangement mode of sub-pixel units and a drive unit in a pixel unit in an n-th column and an arrangement mode of sub-pixel units and a drive unit in a pixel unit in an (n+1)-th column mirror each other, and a mirror axis is a straight line located between the pixel unit in the (n+1)-th column and the pixel unit in the n-th column and parallel to a row direction perpendicular to a column direction, wherein n≥1, and
   pixel units in each row are configured to be connected to scan lines in two rows, a scan line in one row is configured to provide a scan signal to pixel units in even columns, a scan line in the other row is configured to provide a scan signal to pixel units in odd columns, and a scan line in one row passes through the pixel units.

8. The drive circuit of the display panel according to claim 7, wherein:
   when the sub-pixel units and the drive unit are arranged in two rows and four columns,
   for two adjacent columns of pixel units located in a same row, an arrangement mode of sub-pixel units and a drive unit in a pixel unit in an n-th column and an arrangement mode of sub-pixel units and a drive unit in a pixel unit in an (n+1)-th column mirror each other, and a mirror axis is a straight line located between the pixel unit in the (n+1)-th column and the pixel unit in the n-th column and parallel to a row direction perpendicular to a column direction, wherein n≥1.

9. A display apparatus, comprising the drive circuit of the display panel according to claim 8.

10. A display apparatus, comprising the drive circuit of the display panel according to claim 7.

* * * * *